(No Model.)

3 Sheets—Sheet 1.

O. L. PETERSON.
GRAIN DRILL.

No. 463,542. Patented Nov. 17, 1891.

Witnesses,

Inventor,
Ola L. Peterson,
by Higdon & Higdon
Attorneys.

(No Model.) 3 Sheets—Sheet 2.
O. L. PETERSON.
GRAIN DRILL.
No. 463,542. Patented Nov. 17, 1891.
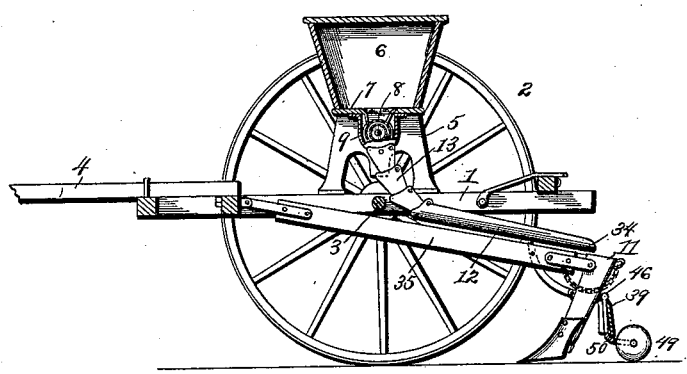
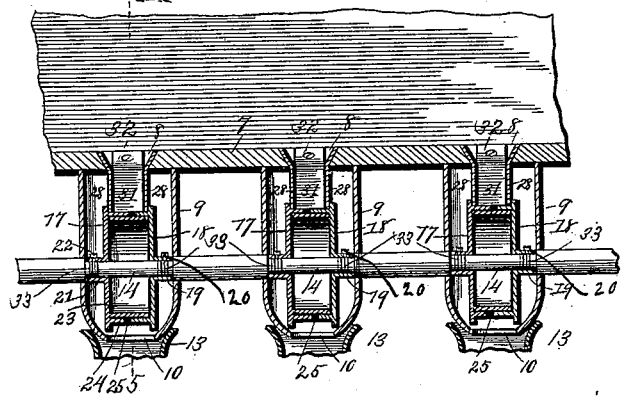
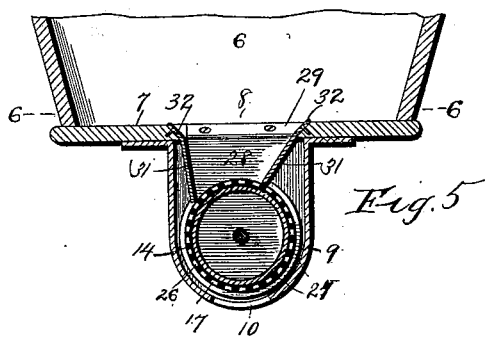
Witnesses:
Inventor:
Ola L. Peterson,
by Higdon & Higdon
Attorneys.
THE NORRIS PETERS CO., PHOTO-LITHO., WASHINGTON, D. C.

(No Model.) 3 Sheets—Sheet 3.

O. L. PETERSON.
GRAIN DRILL.

No. 463,542. Patented Nov. 17, 1891.

Witnesses:

Inventor:
Ola L. Peterson,
by Higdon & Higdon
Attorneys.

UNITED STATES PATENT OFFICE.

OLA L. PETERSON, OF ASSARIA, KANSAS.

GRAIN-DRILL.

SPECIFICATION forming part of Letters Patent No. 463,542, dated November 17, 1891.

Application filed March 9, 1891. Serial No. 384,322. (No model.)

*To all whom it may concern:*

Be it known that I, OLA L. PETERSON, of Assaria, Saline county, Kansas, have invented certain new and useful Improvements in Grain-Drills, of which the following is a full, clear, and exact description, reference being had to the accompanying drawings, forming a part hereof.

My invention relates to machines for planting wheat and other grain by drilling the same into the ground; and the objects of my invention are, first, to provide a feed mechanism by means of which the seed can be fed out of the hopper in greater or less quantities, as desired, and in which the variation of the feed can be readily accomplished by certain adjustments of the feed mechanism; secondly, to provide means which shall effectively prevent waste of the seed, also prevent injury of the feed mechanism by foreign substances or obstacles in the hopper; thirdly, to provide for accurately gaging the amount of seed to be delivered by the feed mechanism.

A further object of my invention is to provide an adjustable support for the drill-boots, whereby they can be made to drill more or less deeply, as desired, but which shall insure uniform drilling when once adjusted; and a still further object of my invention is to provide means for properly covering the seed; also, for setting or packing the ridges, so as to insure the proper protection of the seed and plants.

To the above purposes my invention consists in certain peculiar and novel features of construction and arrangement, as hereinafter described, and pointed out in the appended claims.

In order that my invention may be fully understood, I will proceed to describe it with reference to the accompanying drawings, in which—

Figure 1:
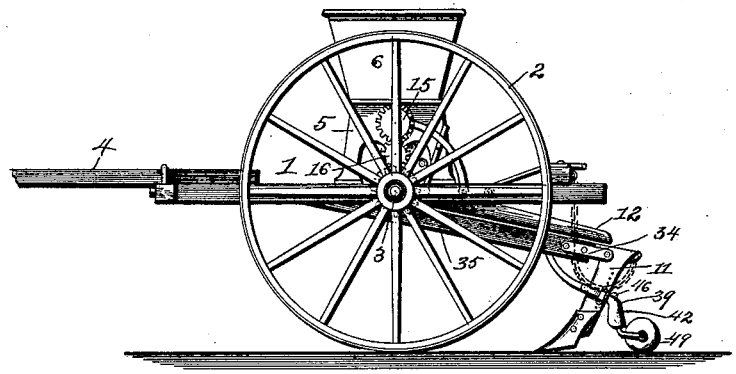
Figure 2:
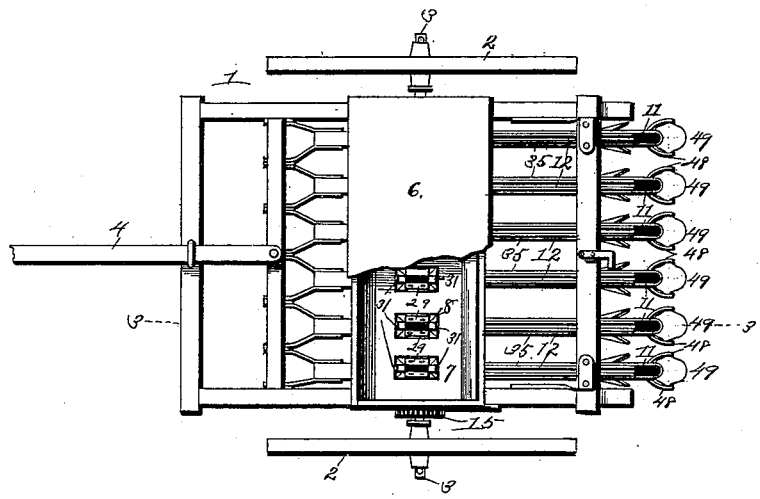
Figure 7:
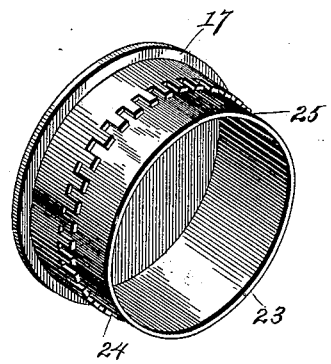
Figure 8:
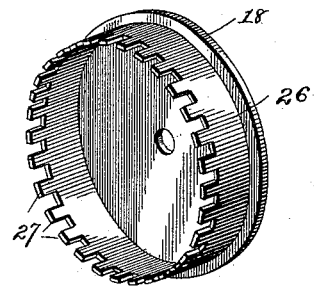
Figure 9:
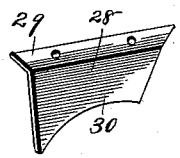
Figure 10:
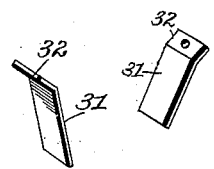
Figure 13:
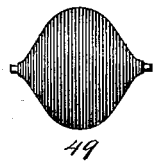
Figure 11:
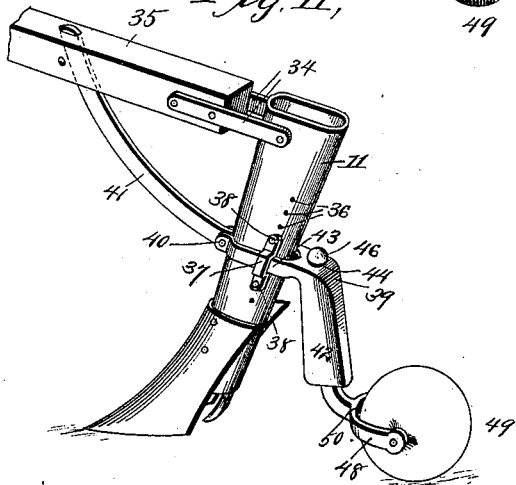
Figure 12:
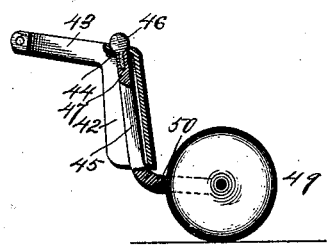

Figure 1 is a side elevation of a grain-drill constructed in accordance with my present invention. Fig. 2 is a plan view of the same, the top of the hopper being partly broken away to expose the feed-plates. Fig. 3 is a vertical longitudinal section of the machine on the line 3 3 of Fig. 2. Fig. 4 is a longitudinal vertical section of a portion of the hopper and the feed mechanism, said parts being shown on an enlarged scale. Fig. 5 is a transverse vertical section of the same on the line 5 5 of Fig. 4. Fig. 6 is a horizontal cross-section of the same on the line 6 6 of Fig. 5. Figs. 7 and 8 are detached perspective views of two companion feed-wheels. Fig. 9 is a detached perspective view of one of the side plates of the feed mechanism. Fig. 10 comprises detached perspective views of the two feed-gage plates for each pair of feed-wheels. Fig. 11 is a detached perspective view of one of the drill-boots with my improved adjustable support and covering devices applied thereto. Fig. 12 is a detached view, partly in transverse vertical section and partly in side elevation, of the roller and its connection with the support. Fig. 13 is a detached face view of one of my improved covering-wheels.

In said drawings, 1 designates the framework of a grain-drill, the said frame-work being preferably of rectangular form, as shown, and supported at either side by carrying-wheels 2, which are mounted upon the ends of a suitable axle 3, extending transversely of the said frame-work 1. The front of this frame-work is also provided with a suitable tongue 4, to which the draft-animals are to be harnessed. At the sides of the frame-work on the upper sides thereof and about midway of the length thereof, are mounted two standards 5, upon the upper ends of which is supported a hopper 6, into which the seed to be sown is placed. This hopper extends transversely of the machine in the usual manner, and its bottom 7 is provided with a suitable number of elongated openings 8, the longer axis of each of which extends from front to rear of the machine. To the under side of the bottom of this hopper are secured the upper ends of a number of feed-casings 9, corresponding with and opening into the openings 8 of the hopper. The lower end of each of these feed-casings is formed with an opening 10, through which the seed passes on its way to the drill-boots 11, there being the usual spouts 12 and flexible connections 13 interposed between the bottoms of the feed-casings 9 and the tops of the boots 11, and said spouts and connections serving to direct the seed from the said casings to the boots during the drilling operation.

A feed-shaft 14 extends horizontally beneath the hopper 6 and is journaled at its outer portions in the standards 5, before referred to, and one end of this shaft carries a gear-wheel 15, the teeth of which mesh with the teeth of a gear-pinion 16, journaled upon the corresponding standard 5. The teeth of the gear-pinion 16 in turn mesh with those of a gear-wheel upon the hub of the corresponding carrying-wheel 2. Thus as the machine is drawn along over the ground the feed-shaft 14 is caused to rotate. It is to be understood that any other suitable or preferred gearing for the feed-shaft may be used in lieu of that above described without departing from the present invention.

Upon the shaft 14 and within each casing 9 are mounted two feed-disks 17 and 18, the feed-disks 17 being preferably rigidly secured to the shaft 14. The companion disks 18, however, are mounted adjustably upon said shaft 14, so as to be moved toward or away from the disks 17, and for this purpose each disk 18 is provided with an outwardly-extending hub 19, through which extends a set-screw 20. Thus by loosening the set-screws 20 the disks 18 can be moved longitudinally on the shaft 14, either toward or away from the disks 17, for a purpose to be hereinafter described. If desired, the opposite disks 18 may be provided with hubs 21 and set-screws 22, corresponding to the hubs 19 and set-screws 20 of the disks 17, and for like purposes. The disks 17 are each provided on one side with an annular flange 23, which extends at right angles to the side of the disk and which is concentric with the center of said disk. A second annular flange 24 also extends at right angles from the same side of each disk 17 and is likewise concentric with the center of the disk. This flange 24 is of slightly greater diameter than the flange 23, the inner surface of the flange 24 being in contact with the outer surface of the flange 23 and unites with the disk 17 near the outer edge or margin thereof and is also of less width than the flange 23, as shown. On its outer edge each flange is formed or provided with a number of teeth 25, resembling crown gear-teeth somewhat. The disks 18 are each formed on one side with an annular flange 26, which extends from the disk at right angles to its side and which is of greater diameter than the flange 23 of the disk 17, but of the same diameter as the flange 24 of said disk. The outer edge of the flanges 26 are formed or provided with teeth 27, somewhat resembling gear-teeth. When these feed-disks are in proper working position, their flanges extend toward each other and the teeth of one flange are opposite the spaces between the teeth of the opposite flange. It will thus be seen that by varying the position of each pair of feed-disks, so that they shall be nearer to or farther from each other, the teeth of one disk will enter more or less into the spaces between the teeth of the opposite disk, and hence more or less seed will be fed, as desired.

The hopper is provided with a number of plates 28, which are placed in pairs, one plate of each pair being located on each side of each feed-opening 8. The upper edge of each of these plates 28 is bent outwardly to form a lip or flange 29, which embraces the upper side edge of the margin of the feed-opening and is secured thereto by screws or similar devices. The lower edges 30 are segmental in form and embrace the upper sides of the flanges 24 and also extend closely against the inner sides of the disks 17 18. These plates 28 serve to prevent the seed from escaping over the sides of the disks, and thus avoid the waste of seed which would otherwise occur. At each end of each opening 8 is placed an elongated plate 31, which is of spring-steel. The upper end of each of these plates is turned outwardly to form a lip or flange 32, which embraces the upper side of each of the end margins of each feed-opening, and is secured thereto by screws or equivalent devices. When in proper working position, the plates 31 converge inwardly and downwardly from the feed-openings in pairs, and their lower ends rest upon the upper sides of the flanges 24 26 of the feed-disks and also lie closely adjacent to the inner sides of said disks. These plates serve to gage the stream of seed flowing from the feed-openings and to properly direct it to the apertures of the feed-disks. It will thus be seen that a direct and economical feed is secured, and that the amount of such feed can be readily regulated to accord with the requirements of the kind of seed being sown. It will be further seen that should any foreign substance or obstructions enter the hopper and pass out of the feed-openings the gage-plates 31 will yield, owing to their resilience, and will not be injured or broken.

In order to indicate the various adjustments of the feed-disks, graduating marks or notches 33 are formed transversely upon the feed-shaft 14 adjacent to the hubs of the disks, so that by setting the ends of the hubs in register with one or the other of said marks or notches the required quantity of grain will be fed.

The drill-boots 11 are each attached at their upper ends in customary manner by metal straps 34 to the rear end of the beam 35. About midway of its length each boot is formed on each side with a number of holes or eyes 36, arranged in vertical series, and a metal strap or bridge-piece 37 is secured adjustably upon each side of each boot by pins 38, extending through the ends of said straps or bridge-pieces and entering the holes 36. Each boot is embraced by the bifurcated or forked upper end of a standard 39, the arms 43 of said forked upper portion passing between the straps 37 and the outer sides of the boots 11, as shown. At their front ends the forked arms are pivotally connected by a bolt 40 or similar device to the lower rear end of a bar 41, the upper front end of which is pivoted to the beam 35. The standards 39 are each approximately L-shaped, the forked upper portion above described extending forward at about right angles to vertical body portion of the standard. This vertical body portion 42 is open at its front side and is approximately U-shaped in cross-section, as shown. Through the upper end of the vertical portion 42 and its point of juncture with the forked arms 43 each standard is formed with an eye 44, for a purpose to be hereinafter described. 45 designates a bar which is located within each of the standards 42, and the upper end of which is connected to a ball or head 46, resting upon the upper end of each standard 42. As shown, the ball or head 46 is provided with a screw-threaded stem 47, which enters a screw-threaded socket in the upper end of the bar 45; but, if preferred, the head 46 may be riveted or otherwise suitably attached to the upper end of the standard, so as to enable the parts to be easily connected after having been placed in position. In either event the standard 45 is free to turn axially in the standard 42. The lower part of the standard 45 is forked or bifurcated, as shown at 48, the arms thus formed extending rearwardly and embracing a covering-roller 49, to be hereinafter described. Each of the covering-rollers 49 is of approximately double-ovoid shape, with its axle somewhat prolonged, and at each side the said roller is formed or provided with projections which serve as journals for entering the ends of the arms 48. The form of this roller is such that it properly covers the seed and at the same time solidifies the furrows, and thus protects the seed from drought and freezing during its growth.

In order to properly clear the covering-rollers 49 from mud, &c., as the machine is being used, the bend 50 of each fork 48 may be formed or provided with a knife-edge which conforms to the surface of the roller and readily removes any mud which may accumulate upon the surface of the roller.

The arrangement of the standards 42 and their connections to the boots 11 is of such a character that the boot can be readily adjusted to the drill deeper or shallower, as required, and when so adjusted the drilling will be uniform.

Having thus described my invention, what I claim as new therein, and desire to secure by Letters Patent, is—

1. An improved feed mechanism for grain-drills, comprising a hopper having a number of elongated feed-openings, plates located in pairs at opposite sides of the openings and having segmental lower edges, gage-plates located in pairs at opposite ends of the feed-openings and each composed of an elongated piece of spring metal, and a number of feed-wheels carrying feed-cups and located beneath said feed-openings, substantially as set forth.

2. An improved attachment for grain-drills, &c., comprising a standard forked at its upper end to embrace a drill-boot and having an open body portion, and a standard forked at its lower end to receive a covering-wheel and swiveled at its upper end to the upper end of the open standard, substantially as set forth.

3. An improved feed mechanism for grain-drills, comprising a hopper having a number of elongated feed-openings in its bottom, plates located in pairs at opposite sides of the openings and having segmental lower edges, gage-plates located in pairs at opposite ends of the feed-openings and each composed of an elongated piece of spring metal, oppositely-disposed feed-disks arranged in pairs beneath said feed-openings and having toothed flanges forming feed-cups, outwardly-extending hubs carrying set-screws, and a feed-shaft extending through said hubs and provided with external graduations or marks to indicate the various adjustments of the feed-wheels, substantially as set forth.

4. An improved attachment for grain-drills, &c., comprising a standard forked at its upper end to embrace a drill-boot and having an open body portion, a vertical strap located at each side of the drill-boot and overlying the corresponding arm of the fork, pins entering the ends of the straps and also entering holes arranged in vertical series at opposite sides of the boot, and a standard forked at its lower end to receive a covering-wheel and swiveled at its upper end to the upper end of the open standard, substantially as set forth.

In testimony whereof I affix my signature in presence of two witnesses.

OLA L. PETERSON.

Witnesses:
J. O. JOHNSON,
THOS. CORRIGAN.